United States Patent [19]

Morin

[11] 4,288,280
[45] Sep. 8, 1981

[54] TAPE APPLYING MACHINE

[75] Inventor: Robert W. Morin, Salem, Mass.

[73] Assignee: Boston Machine Works Company, Lynn, Mass.

[21] Appl. No.: 86,355

[22] Filed: Oct. 19, 1979

[51] Int. Cl.³ .......................... B26D 7/08; B65C 9/18
[52] U.S. Cl. ................................... 156/510; 83/168; 83/922; 156/517; 156/521; 156/538; 156/DIG. 33
[58] Field of Search ............... 156/510, 521, 519, 517, 156/264, 538, 566, 571, DIG. 33, DIG. 42; 83/922, 168

[56] References Cited

U.S. PATENT DOCUMENTS

| | | | |
|---|---|---|---|
| 3,232,815 | 2/1966 | Klopfenstein et al. | 156/566 |
| 3,243,329 | 3/1966 | Anderegg | 156/DIG. 42 |
| 3,587,376 | 6/1971 | Hirano et al. | 83/922 |
| 3,681,160 | 8/1972 | Richie et al. | 156/521 |
| 3,756,899 | 9/1973 | Von Hofe et al. | 156/521 |
| 3,929,552 | 12/1975 | Bettenhausen et al. | 156/521 |
| 4,108,706 | 8/1978 | Brands et al. | 156/521 |

Primary Examiner—Michael G. Wityshyn
Attorney, Agent, or Firm—Morse, Altman, Oates & Dacey

[57] ABSTRACT

A machine for applying a reinforcing tape to a workpiece positioned on a support. A unidirectional feeder advances a set length of tape onto a pad pivotable between a loading position adjacent a cutter and a tape applying position over the workpiece. The cutter, provided with a self-cleaning blade, severs the tape so that the set length remains on the pad. The pad has a roughened surface and a retainer. A driver pivots the pad so that the tape, which is immobilized thereon by the roughened surface and the retainer, is pressed onto the workpiece.

7 Claims, 6 Drawing Figures

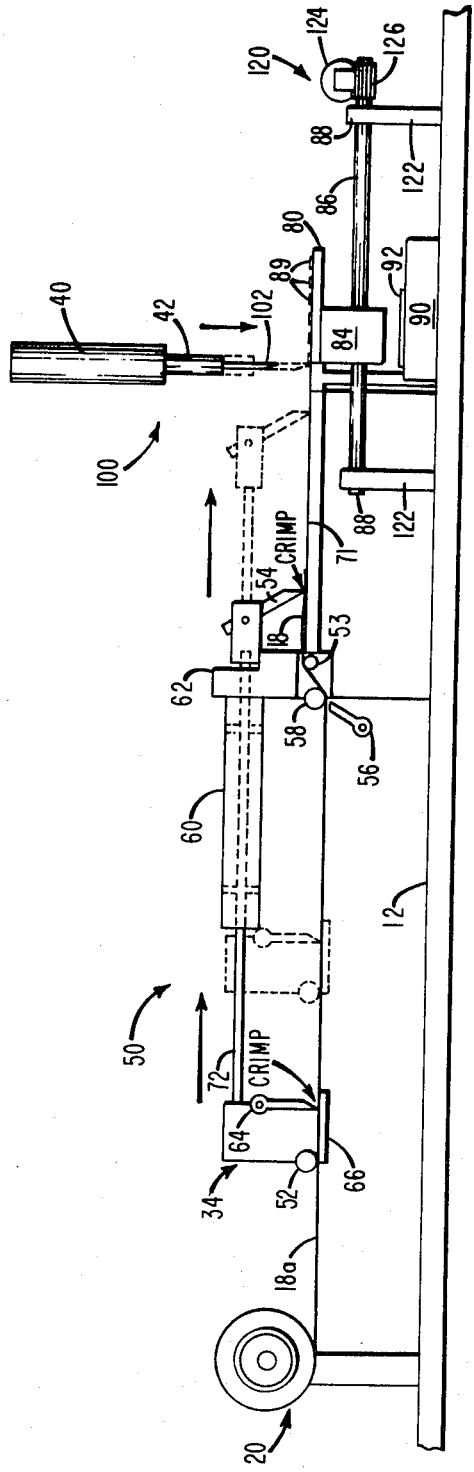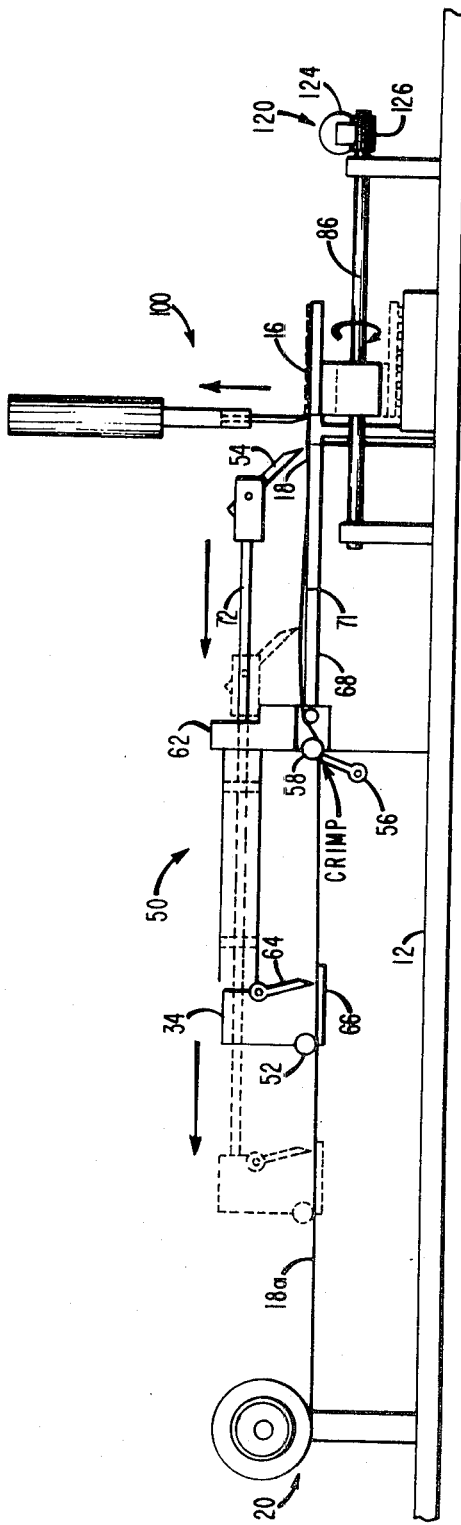
FIG. 5
FIG. 6

TAPE APPLYING MACHINE

BACKGROUND OF THE INVENTION

1. Field of the Invention

The present invention relates to machines for applying tapes to workpieces and, more particularly, is directed towards a tape applying machine for feeding, cutting and applying preselected lengths of tape to workpieces.

2. The Prior Art

The cutting to length and the application of reinforcing tape in the shoe and luggage making arts is, as far as known, done by hand. If done by hand, it is expensive in that it takes a relatively long time and it tends to be imprecise in both the successive lengths of tape cut and in their application to the desired location on a workpiece. This results in a relatively high percentage of rejects, hence waste and inefficiency.

SUMMARY OF THE INVENTION

It is, therefore, a principal object of the present invention to overcome the above shortcomings by providing a machine that feeds and cuts a precise length of tape and applies it at a desired location to a workpiece.

More specifically, it is an object of the present invention to provide a tape applying machine that is designed to grab, feed and cut a predetermined length of tape from a supply of tape onto a pad operable between a first position adjacent a cutter and a second position over a workpiece.

It is a further object of the present invention to provide a tape applying machine which is pneumatically actuated and in which the tape applying pad is designed so that the cut length of tape thereon is retained in place when the pad is moved from its position adjacent the cutter to its position over the workpiece.

It is a still further object of the present invention to provide a tape applying machine having a unidirectional feeder and a cutter structure including a removably mounted self-cleaning blade for preventing the tape from adhering thereto.

Briefly, the tape applying machine of the present invention comprises a supply of tape mounted adjacent a unidirectional feeder that advances a set length of tape onto a pad pivotable between a loading position adjacent a cutter and a tape applying position over a workpiece. The feeder includes a double-action feed cylinder whose piston is provided with a feed detent operable between a tape-engaging and a non-engaging position. The cutter includes a removably mounted self-cleaning blade that wipes itself clean between cutting operations, a pair of guide pins for locating the blade with respect to the tape and a cutting block mounted between the guide pins to support a portion of the tape when it is engaged by the blade. A work support is provided for locating a piece of work in operative association with the tape applying pad. A driver pivots the pad from its loading position to its tape applying position. A cut length of tape, which is retained by fingers on the pad during its movement, is pressed onto the workpiece by the pad.

BRIEF DESCRIPTION OF THE DRAWINGS

For a fuller understanding of the nature and objects of the present invention, reference is made to the following specification, which is to be read in reference to the accompanying drawings, wherein:

FIGS. 5 and 6 are schematic views, particularly showing the operation of the tape applying machine of the invention.

DETAILED DESCRIPTION OF THE PREFERRED EMBODIMENT

Figure 1:
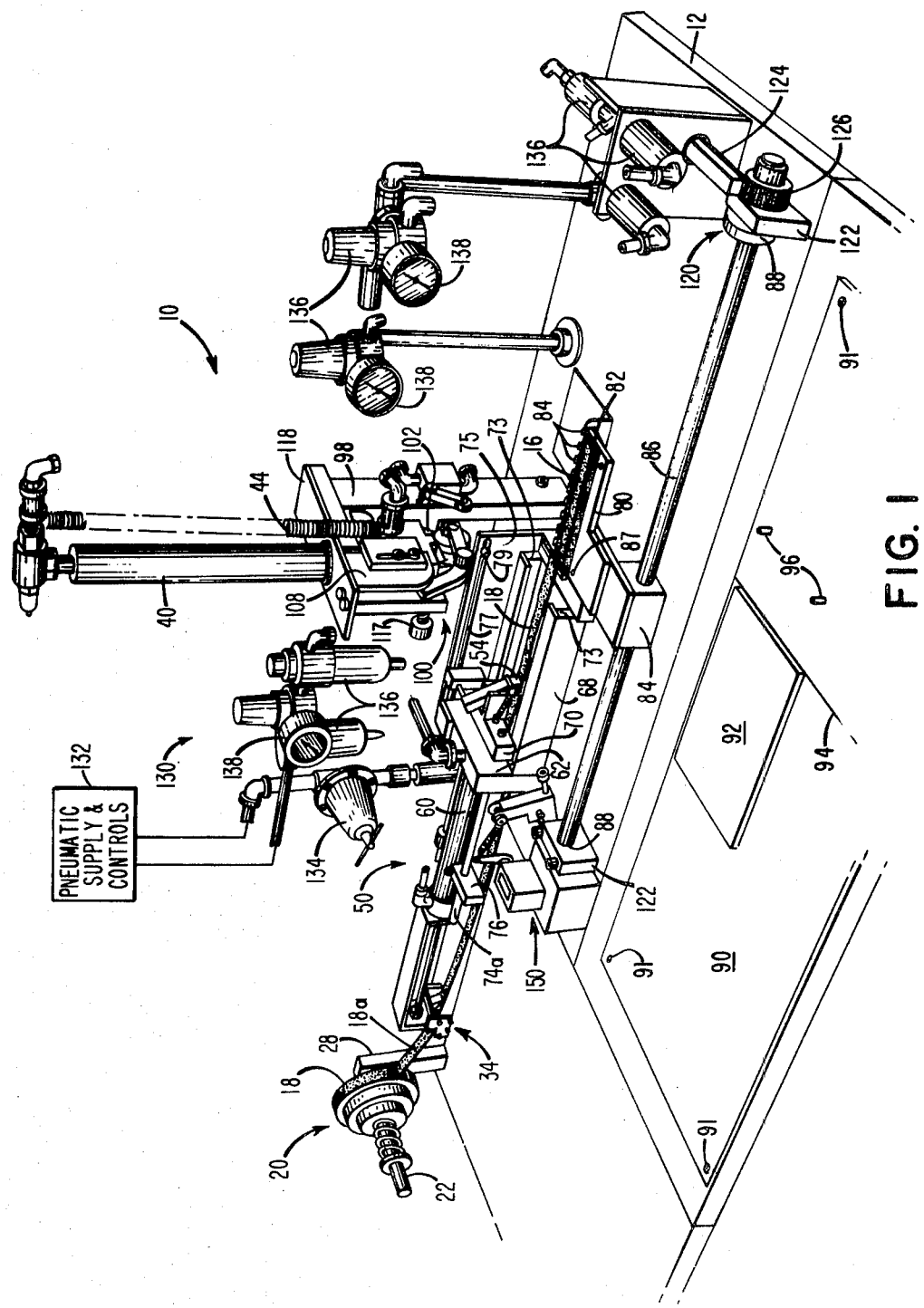
FIG. 1 is a perspective view of a tape applying machine constructed in accordance with and embodying the present invention.

A preferred embodiment of a tape applying machine 10 is shown in perspective in FIG. 1. The construction of the machine 10 will be described with reference to FIGS. 1, 2, 3 and 4 and its operation will be described with particular reference to FIGS. 5 and 6.

Figure 2:
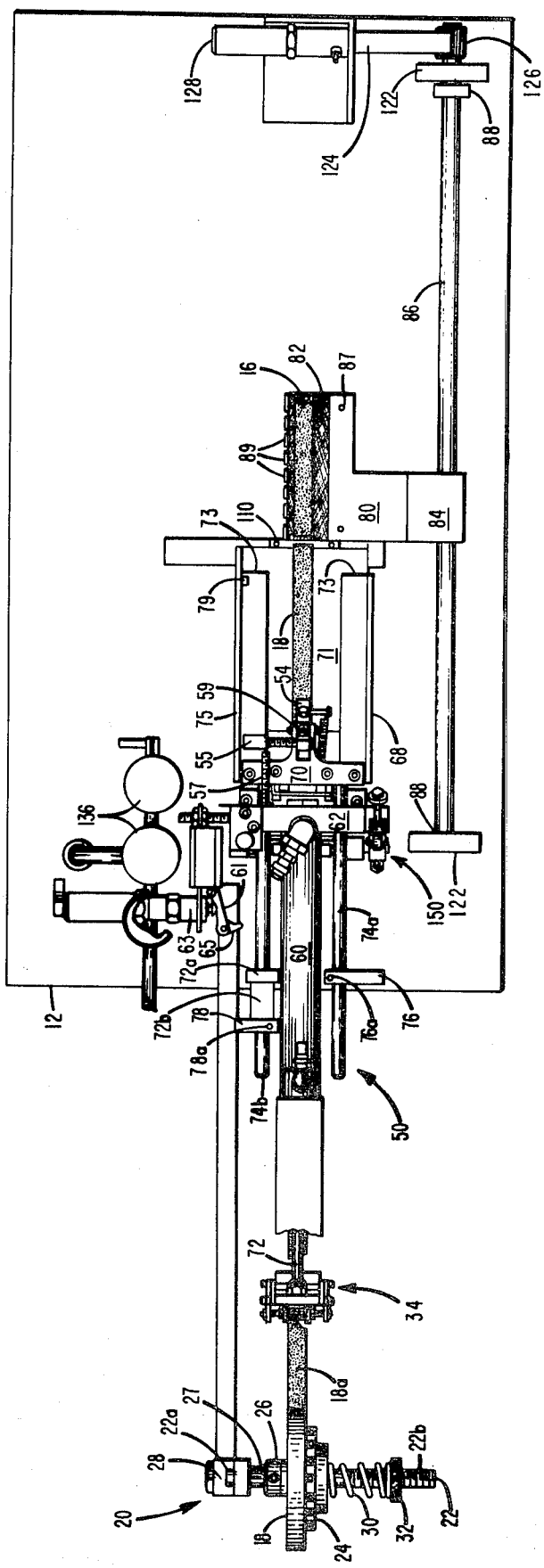
FIG. 2 is a plan view of a portion of the tape applying machine shown in FIG. 1 but on an enlarged scale.

As may be best observed with reference to FIGS. 1 and 2, the tape applying machine 10 essentially comprises a supply 20 of tape, a unidirectional feeder 50 for grabbing and feeding a certain length of this tape along a feed path, a tape applying pad 80 disposed in the feed path and operable in two positions, a tape receiving position and a tape applying position, a cutter structure 100 also disposed in the feed path between the feeder 50 and the pad 80 to sever a selected length of the tape fed onto the pad 80, a work support 90 mounted in operative association with the pad 80 for locating a piece of work 92 with respect thereto, and a driver arrangement 120 for moving the tape applying pad 80 from its first operative position, the tape receiving position adjacent the cutter structure 100, to its second position, the tape applying position over the workpiece 92. The tape applying machine 10 is mounted on a suitable base 12 and is preferably pneumatically actuated by a suitable structure 130 shown connected to a pneumatic supply and controls 132. It is to be understood, however, that the machine 10 may be equally well actuated by an electric motor or by hydraulic means.

The supply 20 of tape includes a horizontal rod 22 whose one end 22a is secured in a stand 28 mounted onto the base 12. The rod 22 accommodates a hub 24 thereon designed for counter-clockwise rotation. The hub 24 is retained on the rod 22 by a retaining member 26 secured to the rod 22 by a screw 27 on one side and by a spring 30 on the other side. An internally threaded nut 32 meshes with an externally threaded end 22b of the rod 22 so as to maintain the spring 30 under tension. A roll of tape 18 is slipped over the hub 24 in a manner that its tacky side 18a is facing upward as it unwinds therefrom.

The tape 18 is advanced in a feed path by the unidirectional feeder 50 toward the tape applying pad 80. The feeder 50 comprises a double-action feed cylinder 60 whose piston 72 is provided with a feed detent 54 at its forward end and with a grabber 34 at its rear end.

The front end of the double-action feed cylinder 60 is secured to a block 62 which has suitable apertures so as to admit therethrough the piston 72 and a pair of guide rods 74a and 74b mounted parallel with the piston 72 and on each side thereof, as may be best observed in FIG. 2. Guide rods 74a and 74b are secured to a moving member 70, while the forward end of piston 72 extends therethrough and connects with the feed detent 54.

Feed detent 54 is operable in two positions, a tape-engaging position and a non-engaging position. Switching between the two positions is effected by a switch 59 carried by the member 70, with the switch 59 being actuated by an arm 55 contacting a bolt 79 on the one hand and an externally-threaded bolt 57 on the other. The bolt 79 is adjustably secured within a slot 77 formed in a vertical plate 75 mounted to the base 12 adjacent the moving member 70. The position of the bolt 79 is used to vary the length of the tape 18 being advanced by the feeder 50 onto the pad 80 when the feed detent 54 is moved by the piston 72 from its retracted position to its extended position. When the arm 55 engages the bolt 79, the feed detent 54 assumes its tape non-engaging position and maintains it during its movement by the piston 72 from its extended position to its retracted position. In the retracted position, the arm 55 of the switch 59 engages the member 57 extending from the face of the block 62 and effects once again for the feed detent 54 to assume its tape-engaging position. The extent of protrusion of member 57 is adjustable by its rotation. Guide rod 74a accommodates an arm 76 secured thereto by a set screw 76a and is designed to actuate a counting mechanism 150 which counts the number of tapes fed, cut and applied by the tape applying machine 10. The other guide rod 74b is provided with an arm 78 that is secured thereto by a set screw 78a. As the feed detent 54 travels between the retracted and the extended positions, the arm 78 contacts a freely rotable cam 65 that is eccentrically mounted to an actuating arm 61. A switch 63, which energizes the cutting structure 100, is actuated by the arm 61. As the feed detent 54 travels from the retracted position to the extended position and the arm 78 contacts the cam 65, cam 65 rotates freely without moving the arm 61 and switch 63 is not actuated. However, as the feed detent 54 travels from the extended position to the retracted position, arm 78 contacts the cam 65 again and, due to its eccentrical mounting to the arm 61, moves the arm 61. The switch 63 is actuated when its arm 61 is depressed. Actuation of the switch 63 by the arm 78 actuates the cutting structure 100, severing thereby the tape 18 from the supply 20 so that a cut length 16 thereof remains on the pad 80. A stop ring 72a is secured to the arm 78 by a spacer sleeve 72b so as to arrest the forward motion of piston 72 by coming to rest against the back side of the block 62.

The moving member 70 is designed to be displaced in the feed path within a support structure 68. This structure 68 is formed with a floor 71 and a pair of side channels 73, 73 so as to guide the motion of moving member 70, together with the pair of guide rods 74a and 74b.

The feeder 50 is designed to feed a certain length of tape 18 onto the tape applying pad 80. This tape applying pad 80 is provided with a roughened surface 82 so as to inhibit a tape 16 cut and deposited thereon from moving around. The tape applying pad 80 is furthermore provided with a retainer 81, observe FIG. 4, having a series of fingers 89 extending above the plane of the roughened surface 82. These fingers 89 of the retainer 81 are designed to hold the cut length of tape 16 against centrifugal force onto the roughened surface 82 when the tape applying pad 80 is pivoted from its first operative position adjacent the cutter structure 100 shown in FIGS. 1 and 2 to its second operative position over the workpiece 92, shown in FIG. 4. Retainer 81 is spring loaded by springs 83 and held to the pad 80 by a pair of bolts 85 secured within suitable holes 87 of the pad 80. The pad 80 is secured to a block 84 that is mounted over a moving rod 86 whose respective ends are journaled, as at 88, in suitable bearings supported within a housing 122 on each side thereof. The driver 120 for pivoting the tape applying pad 80 between its two operative positions is shown as comprising a rack 124 cooperating with a pinion 126, with the rack 124 being actuated by a double-acting pad cylinder 128, as best observed in FIGS. 1 and 2.

A suitable work support 90 is shown secured by screws 91 to the base 12. Work support 90 is preferably provided with one or more marker lines 94 to aid a worker to position a piece of work 92 properly with respect to the tape applying pad 80 so that the cut length of tape 16 thereon is pressed properly in place where desired on the workpiece 92. In addition to the marker line 94, the work support 90 can also be provided with a plurality of stops 96 to locate other pieces of work unto which cut lengths of tape 16 are desired to be applied. Most of such pieces of work 92 comprise shoe parts, such as shoe uppers, and luggage parts which may be made of leather or vinyl. The object is to reinforce such workpieces 92 by means of this tape 16 so they can be stitched by a stitching machine without the workpiece 92 being ripped.

Figure 3:
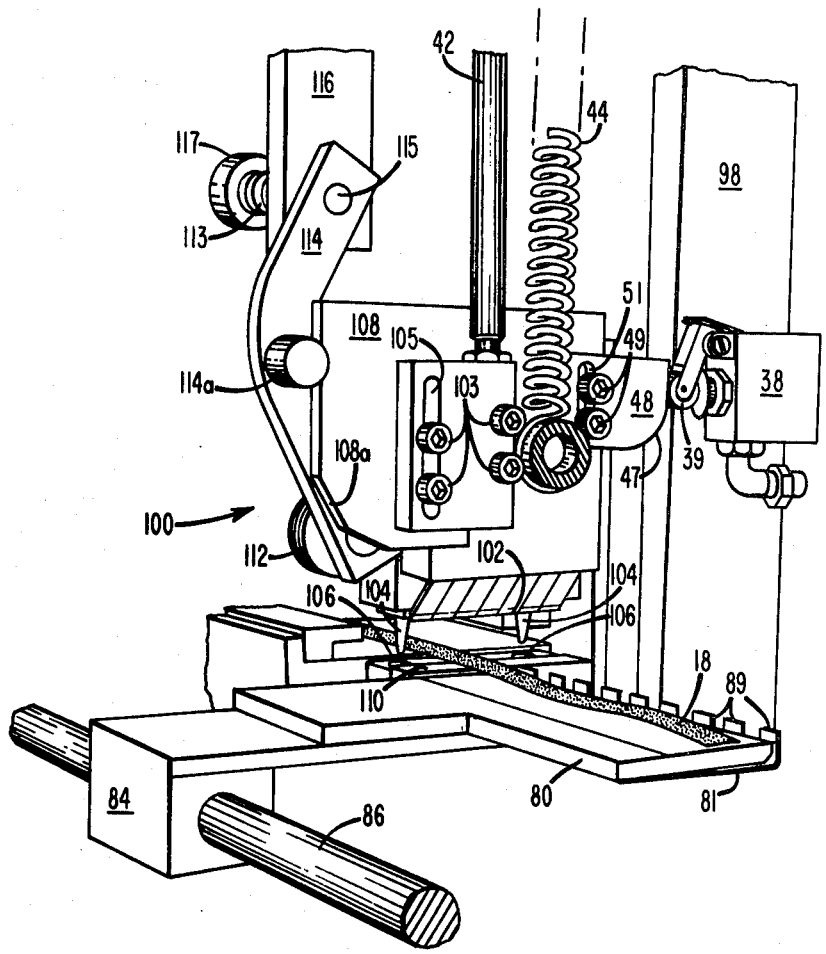
FIG. 3 is a perspective view of another portion of the tape applying machine shown in FIG. 1, also on an enlarged scale.

The cutter structure 100 comprises a cutter blade 102 which is removably secured to a movable block 108 by suitable bolts 103 mounted within a slot 105, as may be best observed in FIG. 3. A pair of guide pins 104 are provided on each side of the cutter blade 102 and cooperate with a pair of guide holes 106 mounted adjacent a cutting block 110 which is removably secured to the forward end of the support structure 68. The cutting block 110 is preferably mounted so that its surface extends above the plane of both the floor 71 of support structure 68 and that of the tape applying pad 80.

A wiping roller 112, mounted at one end of an L-shaped arm 114, is designed to wipe clean and apply oil to the cutting blade 102 both before and after it effects a cutting operation so as to prevent the tape 18 from adhering thereto, it being noted that it is the tacky side 18a that is facing toward the cutting blade 102. The wiping roller 112 is normally in its position shown in FIG. 1 where the movable block 108 carrying the cutter blade 102 is in its raised position and held in its raised position by a spring 44. The other end of the L-shaped arm 114 is mounted about a pivot rod 115 secured within the lower end of a support 116 and held therein in the raised position by a spring 113 and a retainer nut 117. Support 116 descends from one end of a horizontal member 118 which is secured at its other end to a stand 98 mounted on base 12. Horizontal member 118 also accommodates a single-action blade cylinder 40 whose piston 42 is designed to move movable block 108 downward and thereby the cutting blade 102 when it is intended to sever a set length of tape 18 from its supply 20 and deposited onto the tape applying pad 80. When the block 108 is moved downward by the action of the piston 42 and against a retaining force exerted by the spring 44, the roller 112 will roll across the length of the cutter blade 102 and swing out of its way by the cooperative action of a roller 114a, mounted substantially at the elbow of the L-shaped arm 114, going around an articulated edge 108a formed on the movable block 108.

With the wiping roller 112 out of the way, the just cleaned and oiled cutter blade 102 can now engage and cut the portion of the tape 18 overlying the cutting block 110. The movable block 108 also has an adjustably mounted member 48 secured thereto by means of bolts 49 engaged in a slot 51. A curved surface 47 of the member 48 cooperates with a roller 39 of a switch 38 also secured to the stand 98, observe FIG. 3.

Operation of the tape applying machine 10 of the invention is preferably by the pneumatic structure 130 connected to the pneumatic supply and controls 132 which, of course, includes suitable filters, switches, valves, regulators and the like. For purposes of clarity, all tubes connecting a plurality of valves 136 to the respective cylinders 60, 40 and 128 and to the supply 132, have been omitted. The operator can carefully control the operation of the machine 10 by observing a number of pressure gauges 138 provided for that purpose. A handy shut-off valve 134 is provided by means of which the operator may turn the air supply 132 to the machine 10 on before its use as well as turn the supply of air 132 off after its use. The wiping roller 112 is preferably made of soft leather and needs to be occasionally oiled during operation of the machine 10.

The tape applying machine 10 of the invention is designed to operate as follows. As may be best observed with reference to FIGS. 5 and 6, the supply 20 of tape includes the roll of tape 18 with its tacky side 18a facing upward and introduced into the rear grabber 34 of the unidirectional feeder 50 underneath a smooth guide roller 52 thereof. Hence, the tape 18 is led over a flat plate 66 and underneath a knurled roller 58 and over a smooth roller 53 into the vicinity of the feed detent 54. With the feed detent 54 in its down tape-engaging position shown in solid lines in FIG. 5, the feed detent 54 presses the tape 18 against the floor 71 of the support structure 68. When cylinder 60 is actuated, piston 72 is moved forward, and with it the feed detent 54 moves tape 18, with its tacky side 18a up, over the floor bed 71. Simultaneously with the forward motion of the feed detent 54, the rear grabber 34 also engages the tape 18 when a rear pawl 64 is pressed against the flat plate 66. The tape 18, securely held by the two crimp actions of the feed detent 54 and the rear grabber 34 of the feeder 50, begins to unwind from its supply 20 as the piston 72 moves from its retracted position, shown in solid lines in FIG. 5, to its extended position shown in phantom lines. The tape 18 is advanced in its feed path along the axial length of the feed cylinder 60 a set length as determined by the location of the stop bolt 79 within the slot 77 so as to deposit this set length of tape 18 onto the roughened surface 82 of the tape applying pad 80. When the arm 55 of the switch 59 contacts the bolt 79, it will cause the feed detent 54 to move from its tape-engaging to its tape non-engaging position, shown in FIG. 6, and also arrest the forward motion of the piston 72. As soon as the forward motion of the piston 72 has been arrested, the double-action feed cylinder 60 will begin to move the piston 72 from its extended position, shown in solid lines in FIG. 6, to its retracted position shown in phantom lines. During the rearward movement of the piston 72, the tape 18 is not moved but is rather held by crimp action effected by a positive holding detent 56 pressing the tape 18 against the knurled roller 58. Thus, the feeder 50 is truly unidirectional. Also, during this rearward movement of the piston 72, the arm 78 will engage the arm 61 and thereby actuate the switch 63 so as to effect the downward motion of the piston 42 of the blade cylinder 40. The cutter blade 102 is thus caused to sever the tape 18 from its supply 20 at a portion overlying the cutting block 110. This will leave the set cut length 16 of tape on the roughened surface 82 of the pad 80. The wiper roller 112 will now have rolled across the entire length of the cutter blade 102 so as to clean it and to apply oil thereto, preventing thereby the tape 18 from adhering to the blade 102. About the time that the cutting blade 102 engages and cuts the tape 18, switch 38 is also actuated by its roller 39 moving around the surface 47 of the member 48, observe FIG. 3. The switch 38 causes the piston 42 to stop its downward motion the moment blade 102 cuts the tape 18 over the cutting block 110. Since the blade cylinder 40 is single-action cylinder, once its air supply forcing its piston 42 downward has been cut off, the action of the spring 44, now fully extended, will bring the piston 42 and the thereto attached movable block 108 upward into its inoperative position shown in FIG. 1. The L-shaped arm 114 by means of its guide roller 114a cooperating with the articulated surface 108a of the block 108, will once again effect the cleaning and wiping of the cutter blade 102 with oil and the removing of any particles that may have attached thereto from the tacky side 18a of the just severed tape 18.

Figure 4:
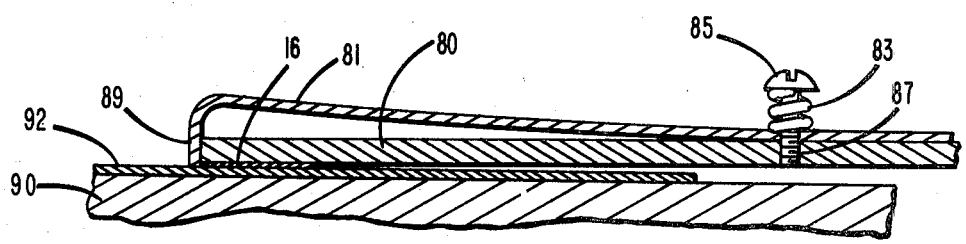
FIG. 4 is a right cross-sectional view, also on an enlarged scale, of a tape applying pad in its second operative position over a workpiece.

The pad 80 with the cut length 16 of tape thereon is pivoted by the driver 120 from its first position adjacent the cutter structure 100 to its second operative position overlying the piece of work 92 shown in FIG. 4. The pivoting is effected by actuating the pad cylinder 128, and thereby the rack and pinion arrangement 124 and 126. This turns the rod 86, and thereby the block 84, so as to pivot the tape applying pad 80 and the fingers 89 in an arc of about 180° to a position over the previously deposited workpiece 92. As the tape applying paid 80 is pivoted, the spring-loaded fingers 89 contact the workpiece 92 and stop. The pad 80 continues its pivoting motion and firmly presses the cut piece 16 to the workpiece 92 in the desired location. Springs 83 exert sufficient force on the fingers 89 to maintain the fingers 89 extended above the plane of the pad 80 during its pivoting movement and yet springs 83 are sufficiently flexible to permit relative movement between the pad 80 and the fingers 89 when the pad continues its forward movement and presses the cut piece 16 against the workpieces 92. The location has been effected by the positioning of the piece of work 92 with the aid of marker lines 94 or stops 96, observe FIG. 1. The cut length 16 of tape is securely held by the fingers 89 of the retainer member 81 against centrifugal force during its pivoting movement. Since it is the adhesive tacky side 18a of the tape 16 which is pressed onto the workpiece 92, the cut length 16 of the tape is securely adhered to the workpiece 92. The workpiece 92 is then taken by the operator and presented to a suitable stitching machine (not shown) so that it can be stitched in the just reinforced area without the workpiece 92 being ripped by the stitching operation.

Thus it has been shown and described a tape applying machine 10 designed to grab, feed and cut a predetermined length 16 of tape from a roll 18 of tape onto a pad 80 operable between its two positions so as to apply thereby the cut length 16 of tape to a workpiece 92 mounted in operative association with the machine 10, which machine 10 thus satisfies the objects and advantages set forth above.

Since certain changes may be made in the present disclosure, it is intended that all matter described in the foregoing specification or shown in the accompanying drawings, be interpreted in an illustrative and not in a limiting sense.

What is claimed is:

1. A tape applying machine comprising:
   (a) means for supporting a supply of tape;
   (b) a member pivotable between a first position and a second position and mounted in operative association with said supply of tape;
   (c) means for feeding a set length of said tape onto said member while it is in its said first position;
   (d) a cutter mounted adjacent said member to cut said length of said tape while said member is in its said first position;
   (e) work support for locating a piece of work in operative association with said member; and
   (f) means for pivoting said member and said cut length of tape thereon from its said first position to its said second position for applying said cut length of tape onto said workpiece;
   (g) said means for feeding a set length of said tape including a cylinder whose piston is provided with a feed detent at its forward end and a grabber at its rear end, said feed detent and said grabber simultaneously operable, first between a tape-engaging and secondly a non-engaging position.

2. The tape applying machine of claim 1 wherein said cutter includes a removably mounted blade and a wiping roller designed to wipe clean and apply an agent to said blade both before and after said blade effects a cutting operation.

3. The tape applying machine of claim 1 wherein said member has a roughened surface and is also provided with spring-loaded retainer fingers to retain against centrifugal force said cut length of tape thereon when said member is pivoted from its said first position to its said second position.

4. A tape applying machine comprising:
   (a) means for supporting a supply of tape;
   (b) a member mounted in operative association with said supply of tape;
   (c) means for feeding a set length of said tape onto said member and including a cylinder whose piston is provided with a feed detent at its forward end and a grabber at its rear end, said feed detent and said grabber operable in unison between a tape-engaging and a tape non-engaging position, and a positive holding detent fixedly mounted between said feed detent and said grabber for preventing said tape from moving when said feed detent and said grabber are operated between their said non-engaging and said tape-engaging positions;
   (d) a cutter to cut said length of tape fed onto said member; and
   (e) means for applying said length of tape onto a workpiece.

5. A machine for applying tape to a workpiece positioned on a support, said machine comprising:
   (a) means for supporting a supply of tape having a tacky and a non-tacky side;
   (b) feed means, including a pair of tape advancing members operable in unison between a rearward position and a forward position, said members positively engaging said tape, with its said tacky side facing upward, at two spaced apart locations when advancing a set length thereof from said supply along a horizontal path, with said members moving from their said rearward to their said forward position, and said members disengaging said tape when moving from their said forward to their said rearward position, during which latter motion said tape is securely held in place by a positive holding member mounted in between said pair of tape advancing members and engaging said tape at its said non-tacky side thereof;
   (c) tape receiving means disposed in said feed path of said tape, said feed means advancing said set length of tape onto said tape receiving means;
   (d) cutter means disposed in said feed path between said feed means and said tape receiving means for severing said set length of tape on said tape receiving means from said supply; and
   (e) means for applying said severed length of tape on said tape receiving means to said workpiece.

6. The machine for applying tape of claim 5 wherein said tape receiving means has a roughened surface and is also provided with a passive retainer to laterally retain said severed length of tape thereon when said means for applying said severed length of tape on said tape receiving means to said workpiece is operated.

7. The machine for applying tape of claim 5 wherein said cutter means includes a removably mounted blade and a wiping roller designed to wipe clean and apply an agent to said blade both before and after said blade effects a cutting operation.

* * * * *